United States Patent Office 2,725,385
Patented Nov. 29, 1955

2,725,385

ADDUCTS OF IMIDES AND POLYISOCYANATES

Nelson V. Seeger, Cuyahoga Falls, and Thomas G. Mastin, Akron, Ohio, assignors, by mesne assignments, to The Goodyear Tire & Rubber Company, a corporation of Ohio No Drawing. Application November 4, 1952,
Serial No. 318,738

7 Claims. (Cl. 260—326)

This invention relates to new compositions of matter and to a method for preparing the same. More particularly, it relates to the mono-adducts of imides and polyisocyanates and to methods for their preparation.

The reactivity of the isocyanate radical with compounds containing labile hydrogen is known. In certain chemical reactions where polyisocyanates are employed, the marked reactivity of the compounds results in certain difficulties. For example, this is true where a polyisocyanate is used to cure or cross-link diisocyanate-modified polyesters or polyesteramides such as those described in our co-pending applications Serial No. 170,055 and Serial No. 170,056 filed June 23, 1950, both now abandoned. According to the present invention, a means is provided for controlling the reactivity of polyisocyanates.

The broad object of this invention is to provide a new class of chemical compounds from polyisocyanates and imides. It is a paritcular object to provide a new class of chemical compounds some of which are useful in delayed-action curing or cross-linking agents for diisocyanate-modified polyesters and polyesteramides. It is another object of this invention to provide as new compositions of matter the mono-adducts of polyisocyanates and imides resulting from the reaction of approximately equal molecular proportions thereof. A specific object is to prepare the mono-adducts of polyisocyanates and imides in which the reactivity of the polyfunctional character of the polyisocyanate may be controlled.

A convenient method for the preparation of the new compounds to which this invention relates may be represented by the following equation:

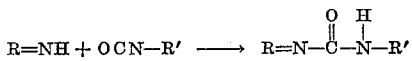

in which R=NH is an imide, in which R is an organic radical containing no groups reactive with an isocyanate group, and R' is an organic radical which contains at least one isocyanate group and no groups reactive with the isocyanate group.

The particular isocyanate radical to which the imido group attaches is not important since the mono-adducts formed are useful in the control of the polyfunctional reactivity of the polyisocyanate without regard to the particular position of attachment of the blocking group. The imido group present in the imide should be the only group present in either the imide or polyisocyanate which contains a reactive hydrogen atom. The presence of reactive hydrogen is determined by the Zerewitinoff method described in J. Am. Chem. Soc. 49, 3181 (1927). The presence of groups, other than the imido group of the imide, which contain reactive hydrogen, permits polymerization reactions which are not desired.

It will be noted that the reaction between the polyisocyanate and imide is a reversible reaction, the direction of which may be controlled by temperature. The mono-adduct of the polyisocyanate and the imide is formed at relatively low temperatures while the formed mono-adduct dissociates into the polyisocyanate and imide at relatively high temperatures, for instance in the range of from 100 to 150° C. It is this temperature control over the direction of the reaction which makes some mono-adducts particularly useful in controlled chemical reactions, such as their use as cross-linking agents for diisocyanate-modified polyesters and polyesteramides. In the latter case, the mono-adduct does not dissociate into the reactive polyisocyanate until the curing temperatures are reached. Therefore, at normal processing temperatures, the mono-adduct remains stable and minimizes the cross-linking of the linear extended polymer. The mono-adducts are also useful as a means for controlling the tendency of polyisocyanates to self-polymerize since the inactivation of one active —NCO group in the polyisocyanate will retard such polymerization.

In the preparation of the mono-adducts, any polyisocyanate may be used provided only that the polyisocyanate is free of groups reactive with the isocyanate radical, such as hydroxyl, carboxyl, primary or secondary amino group. Representative examples are the aliphatic compounds such as ethylene, trimethylene, tetramethylene, pentamethylene, hexamethylene, propylene-1,2, butylene-1,2, butylene-2,3, butylene-1,3, ethylidene and butylidene diisocyanates; the cycloalkylene compounds such as cyclopentylene-1,3, cyclohexylene-1,4, and cyclohexylene-1,2 diisocyanates; the aromatic compounds such as m-phenylene, p-phenylene, 4,4'-diphenyl, 1,5-naphthalene, and 1,4-naphthalene diisocyanates; the aliphatic-aromatic compounds such as 4,4'-diphenylene methane, 4,4'-tolidine, 1,4-xylene, and the tolylene diisocyanates; the nuclear substituted aromatic compounds such as dianisidine diisocyanate, 4,4'-diphenyl ether diisocyanate and chloro-diphenylene diisocyanate; the triisocyanates such as 4,4',4''-triisocyanto triphenyl methane, 1,3,5-triisocyanto benzene, and 2,4,6-triisocyanto toluene; and the tetraisocyanates such as 4,4'-dimethyldiphenyl methane 2,2',5,5' tetraisocyanate.

Any imide in which the imido group is the only group containing reactive hydrogen may be used in the preparation of the mono-adducts. Representative examples are carbamide, succinimide, phthalimide, naphthalimide, and glutarimide.

Certain preferred mono-adducts are those resulting from the reaction of an imide and any one of the following:

1. 4,4'-diphenyl diisocyanate
2. 2,4-tolylene diisocyanate
3. 1,5-naphthalene diisocyanate
4. 4,4'-diphenylene methane diisocyanate Specific mono-adducts which are preferred are those resulting from the reaction of:

1. Succinimide and 4,4'-diphenyl diisocyanate
2. Succinimide and tolylene diisocyanate
3. Succinimide and 1,5-naphthalene diisocyanate
4. Succinimide and 4,4'-diphenylene methane diisocyanate
5. Phthalimide and 4,4'-diphenyl diisocyanate
6. Phthalimide and tolylene diisocyanate
7. Phthalimide and 1,5-naphthalene diisocyanate
8. Phthalimide and 4,4'-diphenylene methane diisocyanate
9. Glutarimide and 4,4'-diphenyl diisocyanate
10. Glutarimide and tolylene diisocyanate
11. Glutarimide and 1,5-naphthalene diisocyanate
12. Glutarimide and 4,4'-diphenylene methane diisocyanate
13. Carbimide and 4,4'-diphenyl diisocyanate
14. Carbimide and tolylene diisocyanate
15. Carbimide and 1,5-naphthalene diisocyanate 16. Carbimide and 4,4'-dimethylene methane diisocyanate In the preparation of the mono-adducts in general, the polyisocyanate and the imide are usually dissolved in a suitable inert solvent such as toluene, methyl ethyl ketone, or o-dichlorobenzene. The solutions are stirred together and permitted to stand. The reaction should be caused to take place at a temperature below the decomposition temperature of the desired product, and preferably at a temperature not exceeding approximately 100° C. In most instances the reaction will proceed satisfactorily at room temperature. The mono-adduct formed separates from the solution and is removed therefrom by filtering or evaporation of the solvent. The time required for the mono-adduct to form will vary from a few minutes to several hours depending upon the particular reactants used. Usually an excess of the polyisocyanate is provided to insure that the product which separates will be substantially pure mono-adduct. The material removed from solution will probably contain small amounts of the di-adduct and the unreacted material which, if necessary, can be removed by recrystallization or extraction procedures known to those skilled in the art.

The preparation of the mono-adducts is illustrated by the following examples which are to be interpreted as representative rather than restrictive of the scope of this invention.

*Example 1*

4,4'-diphenyl diisocyanate (0.15 mols) and phthalimide (0.10 mols) were dissolved in 440 cubic centimeters of methyl ethyl ketone. A white solid separated from solution. The solution was filtered, and a yield of 29.2 grams of mono-addluct was obtained.

*Example 2*

4,4'-diphenyl diisocyante (35.4 grams or 0.15 mols) and succinimide (0.91 grams or 0.10 mols) were dissolved in 440 cubic centimeters of methyl ethyl ketone. A white solid separated from solution which was filtered. A yield of 24.7 grams of the mono-adduct was obtained.

Any of the imides set forth above may be reacted with any of the mentioned polyisocyanates in accordance with the procedure described in the foregoing examples to obtain mono-adducts of the desired type.

This application is a continuation-in-part of our copending application Serial No. 193,513 filed November 1, 1950, now abandoned.

While certain representative embodiments and details have been shown for the purpose of illustrating the invention, it will be apparent to those skilled in the art that various changes and modifications may be made therein without departing from the spirit or scope of the invention.

We claim:

1. As new compositions of matter the mono-adducts of (A) an imide selected from the group consisting of carbimide, succinimide, glutarimide, phthalimide and naphthalimide and (B) an organic polyisocyanate which is free of groups containing active hydrogen.

2. The compositions defined by claim 1 in which A is succinimide.

3. The compositions defined by claim 1 in which A is phthalimide.

4. The compositions defined by claim 1 in which B is 4,4'-diphenyl diisocyanate.

5. The compositions defined by claim 1 in which B is tolylene diisocyanate.

6. The compositions defined by claim 1 in which B is 4,4'diphenylene methane diisocyanate.

7. The method of making the mono-adducts defined by claim 1 which comprises reacting approximately equal molecular amounts of the imide and the polyisocyanate at a temperature below 100° C.

References Cited in the file of this patent

UNITED STATES PATENTS 2,374,136    Rothroch _____ Apr. 17, 1945

OTHER REFERENCES

B. I. O. S. Target No. C 22/4495, (Interview with Professor Otto Boyer, page 4), July 5, 1946.

Frieser: Organic Chemistry, Heath (1944), p. 32.